United States Patent
Banavalikar et al.

(10) Patent No.: US 9,083,605 B2
(45) Date of Patent: *Jul. 14, 2015

(54) PROVIDING SERVICES TO VIRTUAL OVERLAY NETWORK TRAFFIC

(71) Applicant: International Business Machines Corporation, Armonk, NY (US)

(72) Inventors: Bhalachandra G. Banavalikar, Cupertino, CA (US); Keshav G. Kamble, Fremont, CA (US); Dar-Ren Leu, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 34 days.

This patent is subject to a terminal disclaimer.

(21) Appl. No.: 13/758,720

(22) Filed: Feb. 4, 2013

(65) Prior Publication Data
US 2013/0287022 A1    Oct. 31, 2013

Related U.S. Application Data

(63) Continuation of application No. 13/460,558, filed on Apr. 30, 2012.

(51) Int. Cl.
| | |
|---|---|
| *H04L 12/28* | (2006.01) |
| *H04L 12/56* | (2006.01) |
| *H04L 12/701* | (2013.01) |
| *H04L 29/06* | (2006.01) |
| *H04L 12/715* | (2013.01) |

(52) U.S. Cl.
CPC .......... *H04L 45/00* (2013.01); *H04L 29/06829* (2013.01); *H04L 45/64* (2013.01); *H04L 63/101* (2013.01)

(58) Field of Classification Search
CPC ... H04L 45/00; H04L 45/64; H04L 29/06829; H04L 63/101
See application file for complete search history.

(56) References Cited

U.S. PATENT DOCUMENTS

| | | | |
|---|---|---|---|
| 8,165,024 | B2 | 4/2012 | Dolganow et al. |
| 8,249,057 | B1 * | 8/2012 | Mohaban et al. ............. 370/352 |
| 2009/0238071 | A1 | 9/2009 | Ray et al. |
| 2011/0142063 | A1 | 6/2011 | Kasturi et al. |
| 2012/0179796 | A1 * | 7/2012 | Nagaraj et al. ................ 709/223 |

(Continued)

OTHER PUBLICATIONS

International Search Report and Written Opinion from PCT Application No. PCT/IB2013/052439 dated Jul. 9, 2013.

(Continued)

*Primary Examiner* — Hassan Phillips
*Assistant Examiner* — Lonnie Sweet
(74) *Attorney, Agent, or Firm* — Zilka-Kotab, PC

(57) ABSTRACT

According to one embodiment, a method for providing services to network traffic on a virtual overlay network includes receiving network traffic comprising a plurality of packets, determining whether the plurality of packets comprise an overlay header, terminating a tunnel and de-encapsulating inner packets of packets comprising an overlay header, performing services on the plurality of packets or the de-encapsulated inner packets, and originating a tunnel and encapsulating the serviced inner packets or the serviced packets with an overlay header to be switched to a destination address in a virtual network and sending the encapsulated packets, or sending the serviced packets without encapsulating the packets with an overlay header to be switched to a destination address in a non-virtual network.

14 Claims, 9 Drawing Sheets

(56) References Cited

U.S. PATENT DOCUMENTS

2012/0304313 A1* 11/2012 Mao et al. .................. 726/29
2013/0163594 A1* 6/2013 Sharma et al. ............. 370/392
2013/0283364 A1* 10/2013 Chang et al. ............... 726/12
2013/0287036 A1* 10/2013 Banavalikar et al. ...... 370/401

OTHER PUBLICATIONS

Adzuki, "Method to Set a Large-Scale VPN Network," Software Design, No. 200, May 21, 2007, pp. 67-77 (un-translated).

U.S. Appl. No. 13/460,558, filed Apr. 30, 2012.

Mahalingam et al., "VXLAN: A Framework for Overlaying Virtualized Layer 2 Networks over Layer 3 Networks," Network Working Group, Internet Draft, Feb. 24, 2012, pp. 1-20.

Non-Final Office Action from U.S. Appl. No. 13/460,558 dated Jul. 16, 2014.

Final Office Action from U.S. Appl. No. 13/460,558, dated Jan. 2, 2015.

Notice of Allowance from U.S. Appl. No. 13/460,558 dated Mar. 31, 2015.

\* cited by examiner

PROVIDING SERVICES TO VIRTUAL OVERLAY NETWORK TRAFFIC

RELATED APPLICATIONS

This application is a continuation of copending U.S. patent application Ser. No. 13/460,558, filed Apr. 30, 2012; which is herein incorporated by reference.

BACKGROUND

The present invention relates to data center infrastructure, and more particularly, this invention relates to providing deep packet inspection services to virtual overlay network traffic in a data center.

While the need for elasticity of data center infrastructure has been debated in great length and the industry has already imagined multiple competitive ideas on how to make data centers more agile, there has been less emphasis on virtualizing security and services. Some security features include firewall, intrusion prevention system (IPS), intrusion detection system (IDS), etc., and some services include accelerator, virtual private network (VPN) termination, load balancing, traffic compression, intelligent shaping, rate limiting, etc. Sharing infrastructure across multiple applications and clients is becoming increasingly common with server virtualization and distributed application architecture and recent trends indicate that an exponential increase in server-to-server Virtual Overlay Networks, such as virtual extensible local area network (VXLAN) and others, use protocol headers that are encapsulated in packets on top of the original network packet to create location transparency. Due to the additional encapsulation protocol headers, it is not possible for existing or legacy Inter-Networking Elements (INEs), such as physical infrastructure routers and switches, among others, to determine information from within the original packet. This is because the original packet inside of the overlay protocol headers is encapsulated as a traditional data payload to the legacy INEs. Furthermore, this lack of visibility of the original packet prevents INEs from implementing sophisticated network security and services. Protocols like Virtual eXtensible Local Area Network (VXLAN) use User Datagram Protocol/Internet Protocol (UDP/IP) to encapsulate the original Ethernet packet for transmission over physical networks. The original Ethernet packets are tunneled through the network from an originator to a nearest VXLAN gateway. VXLAN gateways connect virtual networks to non-virtual networks (legacy networks having physical components). Since VXLAN gateways understand (are capable of processing) VXLAN protocol and tunnels, they have the capability to identify the encapsulated packets. However, currently, these gateways are not capable of applying services or security to traffic flowing therethrough.

SUMMARY

In one embodiment, a method for providing services to network traffic on a virtual overlay network includes receiving network traffic comprising a plurality of packets, determining whether the plurality of packets comprise an overlay header, terminating a tunnel and de-encapsulating inner packets of packets comprising an overlay header, performing services on the plurality of packets or the de-encapsulated inner packets, and originating a tunnel and encapsulating the serviced inner packets or the serviced packets with an overlay header to be switched to a destination address in a virtual network and sending the encapsulated packets or sending the serviced packets without encapsulating the packets with an overlay header to be switched to a destination address in a non-virtual network.

Other aspects and embodiments of the present invention will become apparent from the following detailed description, which, when taken in conjunction with the drawings, illustrate by way of example the principles of the invention.

DETAILED DESCRIPTION

Figure 1:
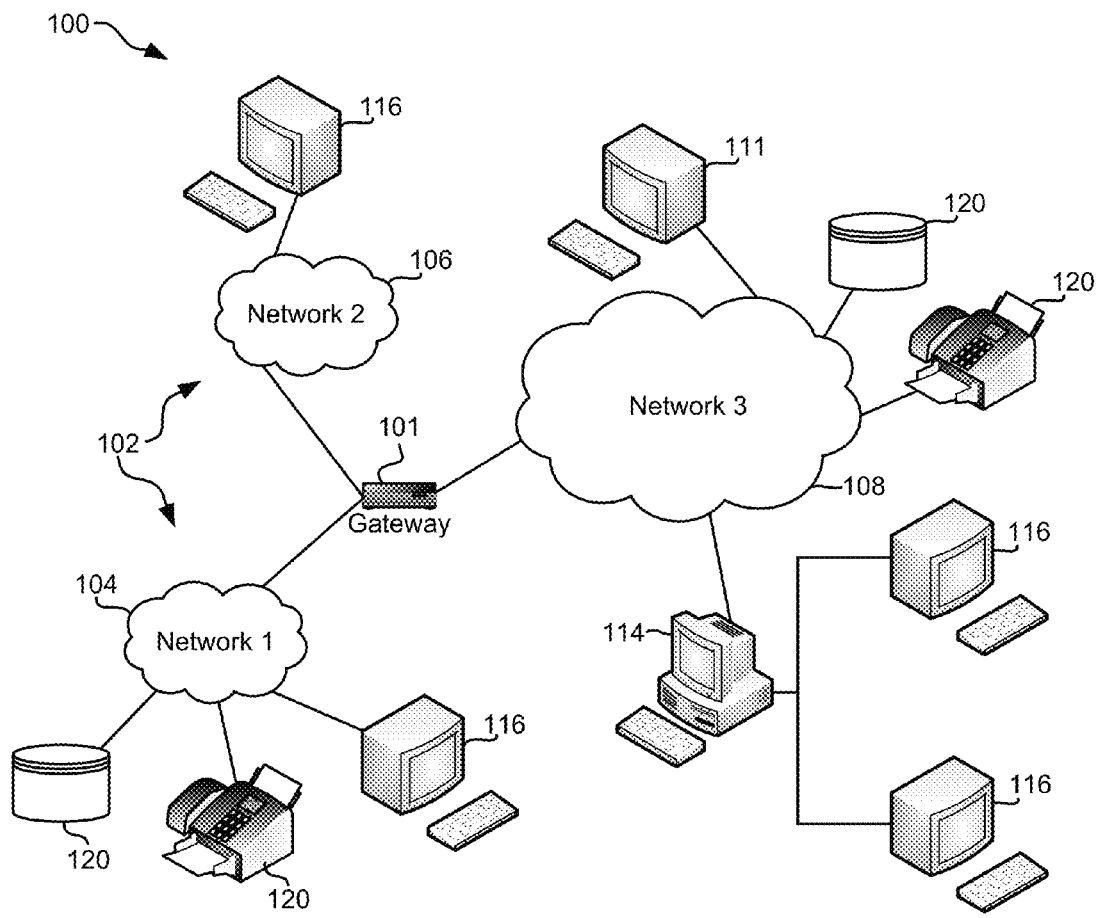
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one approach, virtual local area network (VLAN) gateways and inter-network elements (INEs) may utilize a device for providing deep packet inspection services to overcome the lack of native visibility of inner packets while forwarding virtual overlay network traffic.

In one general embodiment, a system includes an overlay network device which includes an interface adapted for electrically communicating with a virtual overlay network (VON) gateway, logic adapted for receiving a plurality of packets from the VON gateway, logic adapted for determining whether the plurality of packets comprise an overlay header, logic adapted for de-encapsulating inner packets of packets comprising an overlay header, logic adapted for performing services on the plurality of packets or the de-encapsulated inner packets, and logic adapted for encapsulating the serviced inner packets or the serviced packets with an overlay header to be switched to a destination address in a virtual network and sending the encapsulated packets to the VON gateway or logic adapted for sending the serviced packets to the VON gateway without encapsulating the packets with an overlay header to be switched to a destination address in a non-virtual network.

In another general embodiment, a method for providing services to network traffic on a virtual overlay network includes receiving network traffic comprising a plurality of packets, determining whether the plurality of packets comprise an overlay header, terminating a tunnel and de-encapsulating inner packets of packets comprising an overlay header, performing services on the plurality of packets or the de-encapsulated inner packets, and originating a tunnel and encapsulating the serviced inner packets or the serviced packets with an overlay header to be switched to a destination address in a virtual network and sending the encapsulated packets or sending the serviced packets without encapsulating the packets with an overlay header to be switched to a destination address in a non-virtual network.

In yet another general embodiment, a computer program product for providing services to network traffic on a virtual overlay network includes a computer readable storage medium having computer readable program code embodied therewith, the computer readable program code including computer readable program code configured for receiving network traffic comprising a plurality of packets from a VON gateway, computer readable program code configured for determining whether the plurality of packets comprise an overlay header, computer readable program code configured for de-encapsulating inner packets of packets comprising an overlay header, computer readable program code configured for performing services on the plurality of packets or the de-encapsulated inner packets, and computer readable program code configured for alternatively: encapsulating the inner packets or the plurality of packets with an overlay header to be switched to a destination address in a virtual network and sending the encapsulated packets to the VON gateway or sending the serviced packets to the VON gateway without encapsulating the packets with an overlay header to be switched to a destination address in a non-virtual network According to another general embodiment, a system includes one or more interfaces adapted for electrically communicating with one or more virtual networks and one or more non-virtual networks, logic adapted for receiving network traffic comprising a plurality of packets, logic adapted for determining whether the packets comprise an overlay header, logic adapted for terminating a tunnel and de-encapsulating inner packets of packets comprising an overlay header, logic adapted for determining that services are to be performed on the packets and performing the services on the packets, and logic adapted for originating a tunnel and encapsulating the serviced packets with an overlay header and switching the encapsulated serviced packets to a destination address in a virtual network or logic adapted for switching the serviced packets to a destination address in a non-virtual network without encapsulating the packets with an overlay header.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
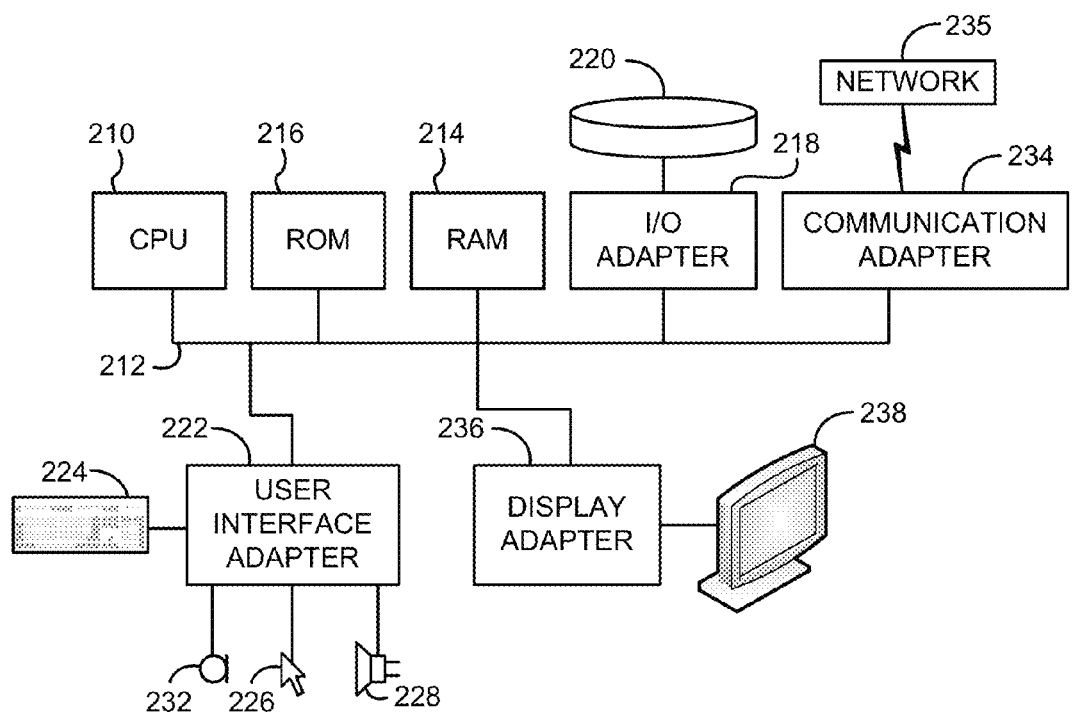
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
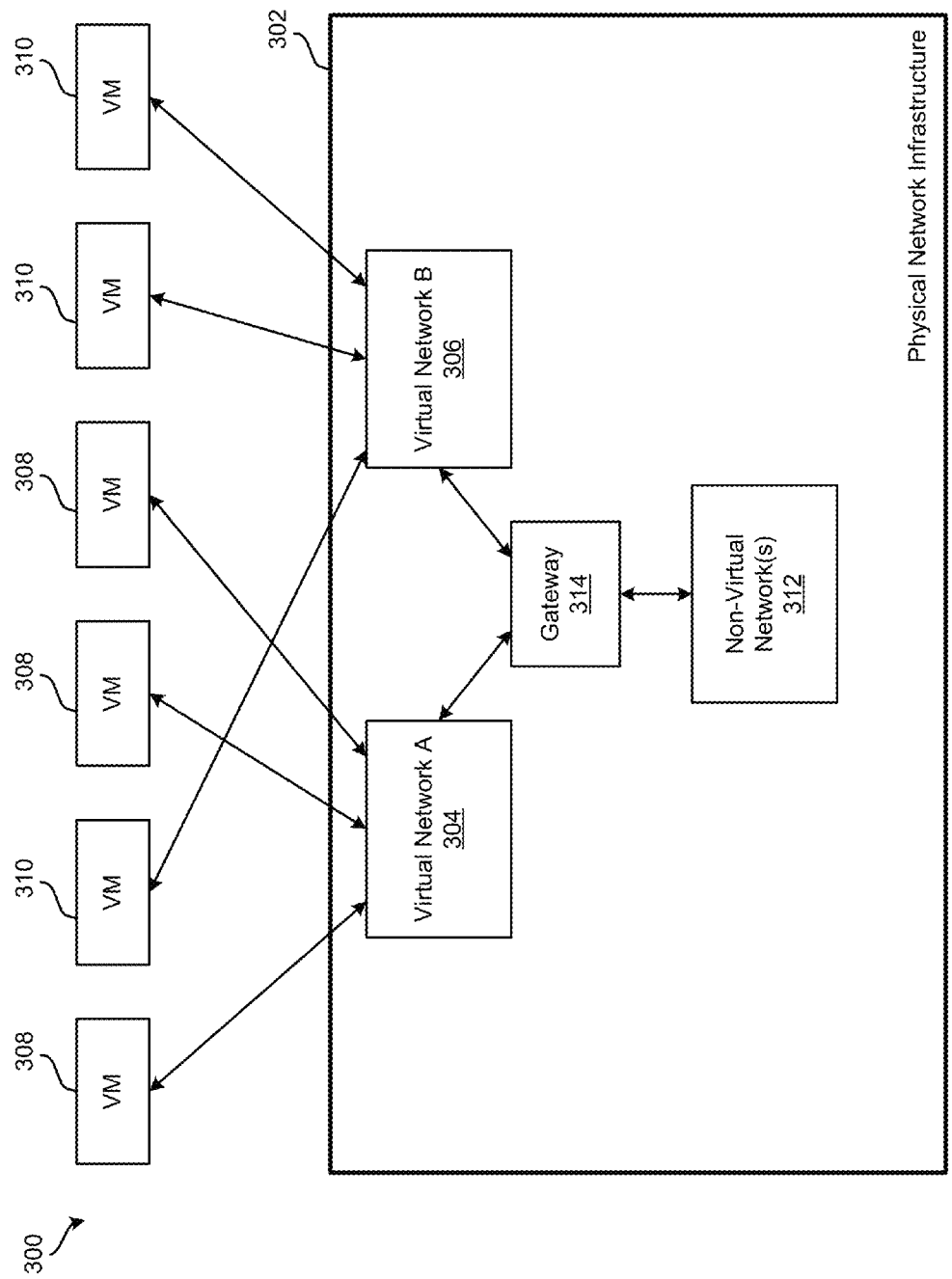
FIG. 3 is a conceptual view of an overlay network, according to one embodiment.

Referring now to FIG. 3, a conceptual view of an overlay network 300 is shown according to one embodiment. In order to virtualize network services, other than simply providing a fabric path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

By having a "flat switch" architecture, the plurality of VMs may move data across the architecture easily and efficiently. It is very difficult for VMs, generally, to move across layer 3-domains, between one subnet to another subnet, internet protocol (IP) subnet to IP subnet, etc. But if it the architecture is similar to a large flat switch, in a very large layer 2-domain, then the VMs are aided in their attempt to move data across the architecture.

Figure 4:
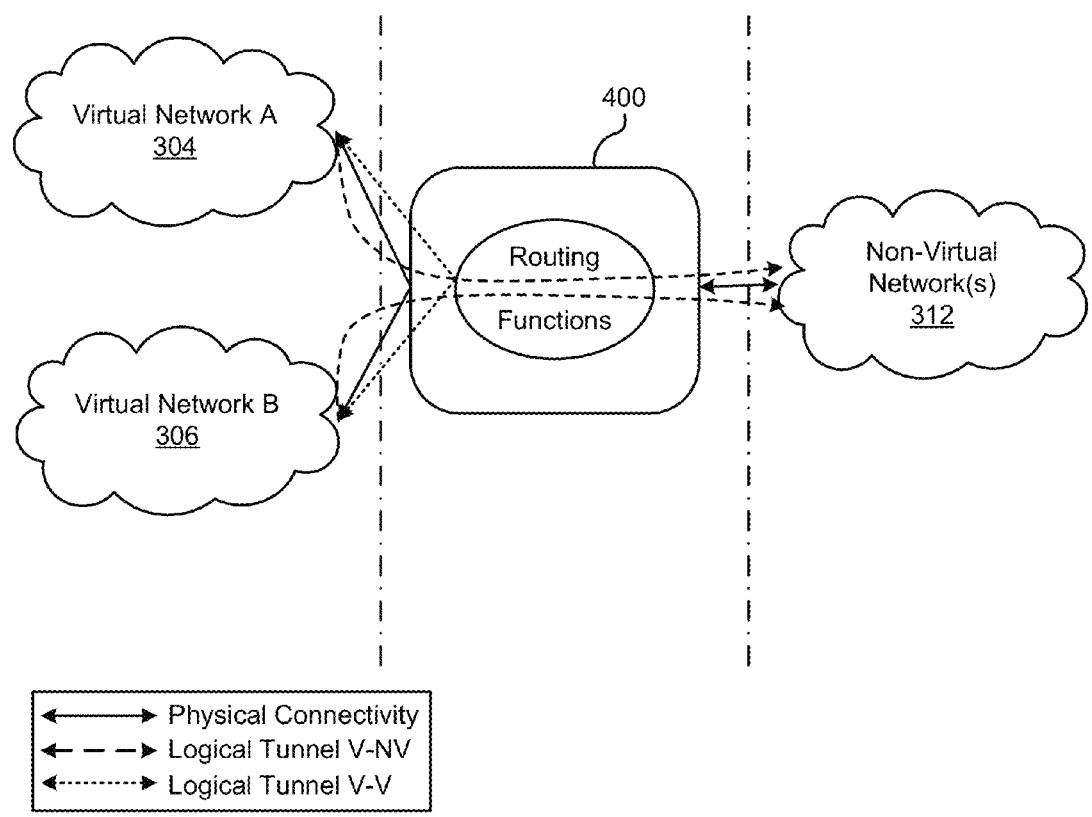
FIG. 4 is a simplified diagram of connectivity between virtual network(s) and non-virtual network(s), according to the prior art.

FIG. 4 is a simplified diagram of connectivity between virtual networks 304, 306 to non-virtual network 312, according to the prior art. As shown, a VON gateway 400 may be used to route traffic from a tunnel originated in a virtual network 304, 306 toward the non-virtual network 312, acting as the tunnel termination point. Furthermore, the gateway 400 may be used to route traffic via tunnels between virtual network 304 and virtual network 306. In order to achieve this, the gateway 400 is connected to the virtual networks 304, 306 and the non-virtual network 312 using physical connections, such as via Ethernet, fiber channel, or any other connection type. However, the gateway 400 is not capable of inspecting traffic that arrives via a tunnel for any packets that may be included in a payload of an overlay packet. Accordingly, there is no way for the gateway 400 to provide services for packets within an overlay packet.

Figure 5:
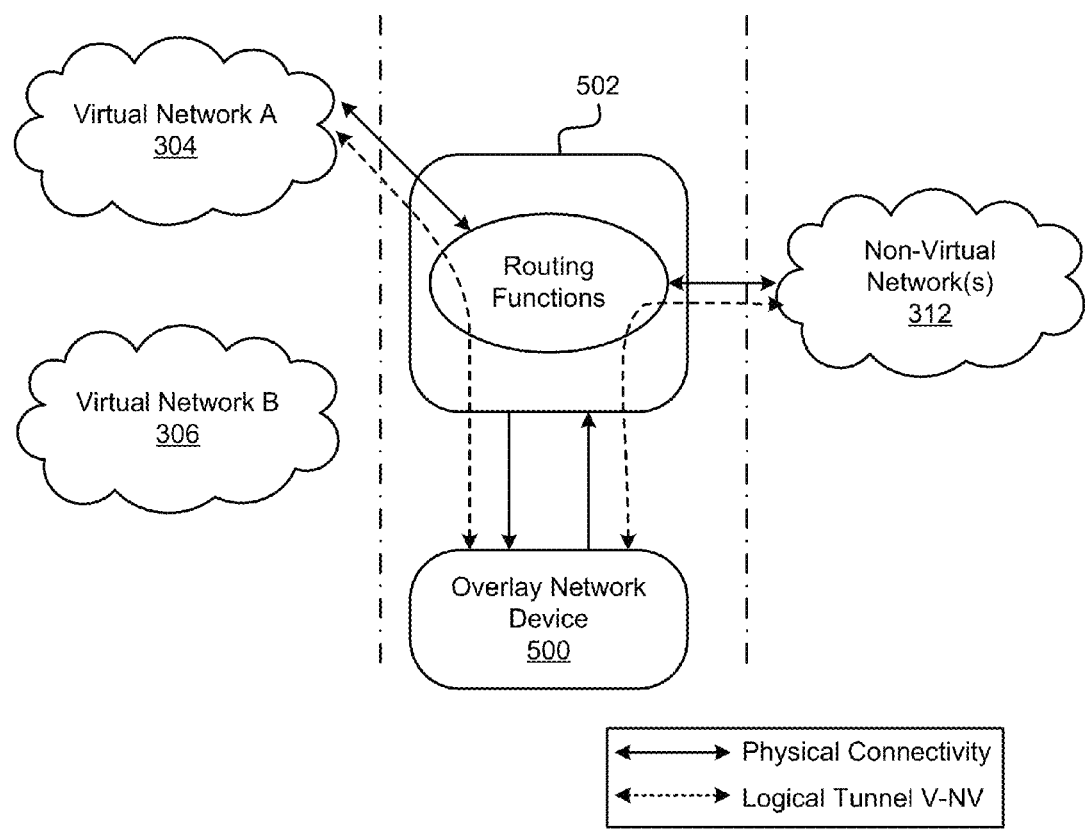
FIG. 5 shows connectivity between virtual network(s) and non-virtual network(s), according to one embodiment.

Now referring to FIG. 5, connectivity between virtual networks 304, 306 and non-virtual network(s) 312 is shown according to one embodiment. As shown, a virtual overlay network (VON) gateway 502, such as a Virtual eXtensible Local Area Network (VXLAN) gateway, may provide routing functions to any traffic that passes through the gateway to or from the virtual or non-virtual networks. In addition, the gateway 502 is capable of directing traffic to an overlay network device 500.

The gateway 502 may comprise a processor for executing logic, such as a central processing unit (CPU), a field programmable gate array (FPGA), an integrated circuit (IC), and application specific integrated circuit (ASIC), or some other suitable processor as known in the art.

Figure 6:
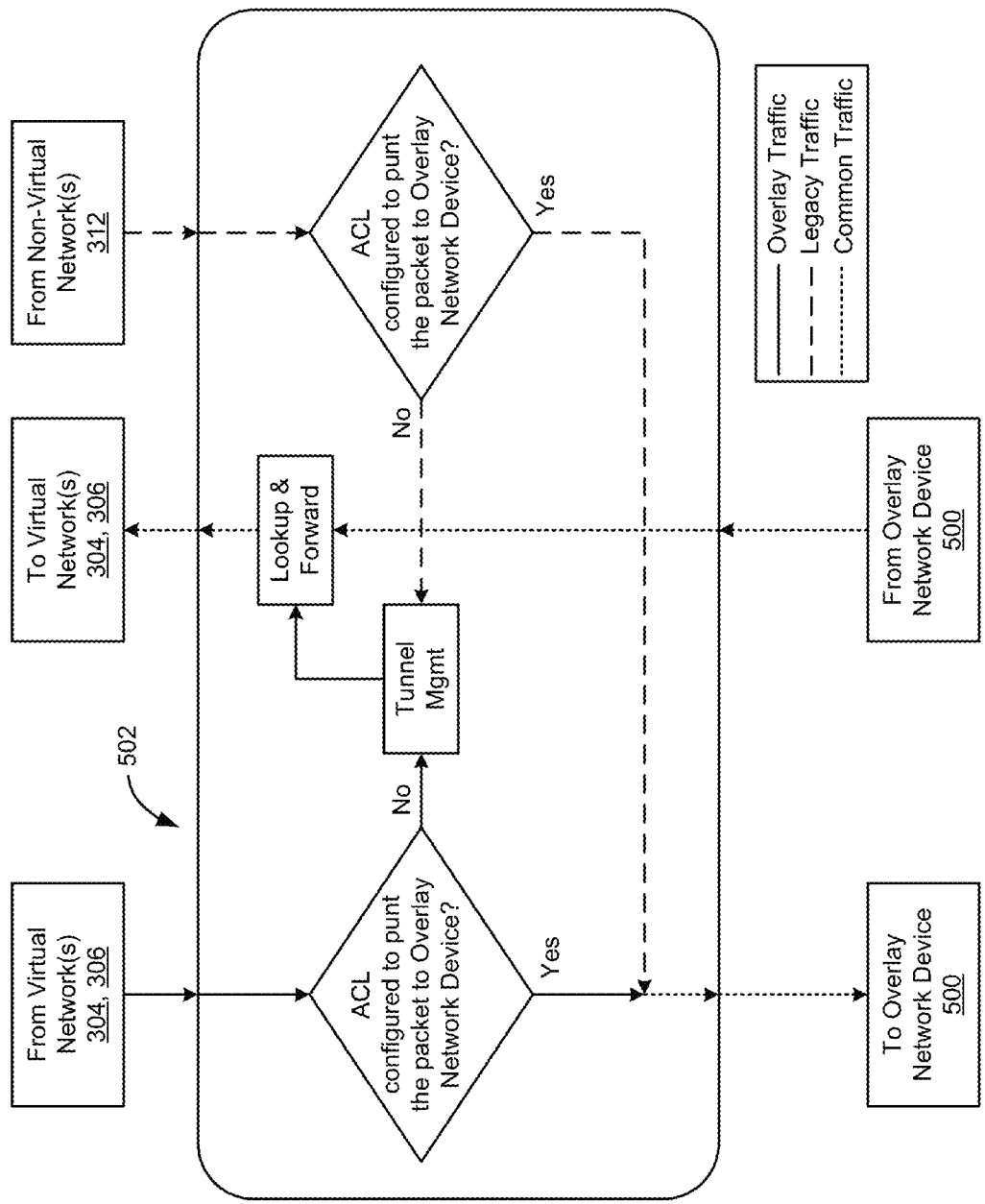
FIG. 6 depicts a simplified flow through a virtual overlay network gateway, according to one embodiment.
Figure 7:
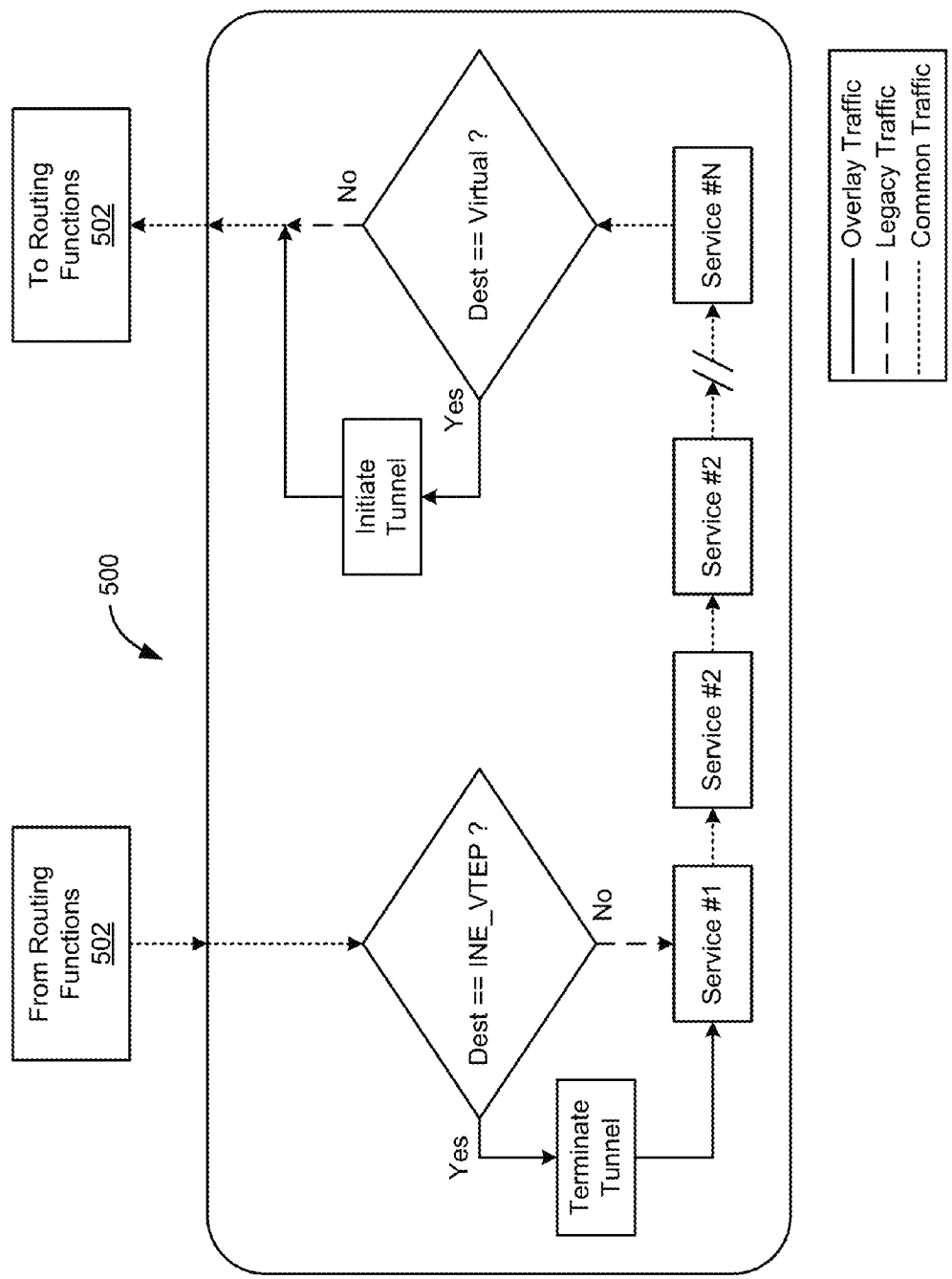
FIG. 7 depicts a simplified flow through an overlay network device, according to one embodiment.

Referring now to FIG. 6, access control lists (ACLs) may be applied to inter networking element (INE) and virtual overlay network (VON) gateway 502 ports to punt incoming VON-encapsulated packets to the overlay network device 500, according to one embodiment. Upon activation of such an ACL on the port, any packets received on the ACL-activated port will be punted to the overlay network device 500. Then, referring to FIG. 7, the overlay network device 500 implements a chain of services. Any services known in the art may be applied to the traffic, such as firewall services, intrusion prevention system (IPS) services, intrusion detection system (IDS), IPS/IDS services, server load balancing services, LAN optimization services, VPN services, video optimization services, network address translation (NAT) services, encryption services, decryption services, etc., among many other possibilities, as would be known to one of skill in the art. Each of these services may be independently activated, independently bypassed, or manually selected, as desired by a system administrator upon initiating the overlay network device 500.

Referring again to FIG. 5, the overlay network device 500 may comprise or be embodied as a processor for executing logic, such as a central processing unit (CPU), a field programmable gate array (FPGA), an integrated circuit (IC), and application specific integrated circuit (ASIC), or some other suitable processor as known in the art. In another embodiment, the overlay network device 500 may be a processor installed in a gateway or INE 502, logic configured in a processor of a gateway or INE 502, or in some other suitable device located external to the gateway or INE 502.

Referring again to FIG. 7, for Layer 3 User Datagram Protocol/Internet Protocol (UDP/IP)-encapsulated traffic arriving from a virtual overlay network (such as virtual network A 304, virtual network B 306, etc.) to the non-virtualized legacy network (such as non-virtual network 312), the overlay network device 500 terminates the flows for which the destination address is the address of the INE Virtual Tunnel End Point (VTEP), de-encapsulates the inner packet and passes the inner packet on to a overlay network device service chain, which may provide services to the inner packet. The packet goes through the chain of services configured and activated inside the overlay network device 500. At the end of the chain, based on the final destination address of the packet, the decision to encapsulate the packet into overlay format (if the destination address is in a virtual network address space) and pass it on tunnel or to pass the packet as it is (if the destination address is in a non-virtual network) is taken and the packet is reinserted back into the INE.

Referring again to FIG. 6, a packet coming from the overlay network device 500 to the INE or VON gateway 502 bypasses any tunnel management logic in the INE 502 and only goes through "Lookup and Forward" logic in the INE 502 to find the egress path through which it enters either into a virtual network (304, 306) or a non-virtual network 312 based on the destination address in the packet.

Similarly, for the traffic coming from non-virtual network(s) 312 to the virtual network(s) 304, 306, the packet is passed to the overlay network device 500 based on ACLs applied to the ingress port. Upon arrival at the overlay network device 500, it is passed through the chain of services configured inside the overlay network device 500. At the end of the chain, based on the final destination address of the packet, the decision to encapsulate the packet into overlay format (if the destination address is in virtual network address space) and pass it on tunnel or to pass the packet as it is (if the destination address is in a non-virtual network) is taken and the packet is reinserted back into the INE 502. A packet coming from the overlay network device 500 to the INE or VON gateway 502 bypasses the tunnel management logic in the INE 502 and only goes through the "Lookup and Forward" logic to find the egress path through which it enters either into the virtual overlay network 304, 306 or the non-virtual legacy network(s) 312 based on the destination address in the packet.

Referring again to FIG. 5, the overlay network device services may be implemented in a virtual appliance, on any type of server such as a commercial off the shelf (COTS) server, as a dedicated chipset installed in an INE or VON gateway 502 such as a VXLAN gateway, or in any other system, device, or processor as would be understood by one of skill in the art upon reading the present descriptions.

Management logic of the overlay network device 500 may also be configured for handling incoming data packets and outgoing data packets, regardless of the packet transfer protocol, e.g., Ethernet, peripheral component interconnect express (PCIe)-over Ethernet, fiber channel (FC) over Ethernet (FCoE), etc.

In one approach, incoming data packets may be analyzed to determine one or more services that the system may perform in the course of processing the incoming data packets. More-over, the services that the system may perform define all or part of a processing pathway that the incoming data packets will traverse in the course of processing the data packets.

For example, in one embodiment where certain services are performed only on a subset of network traffic, data packets requiring those services must be identified as requiring those services in order to receive the service of interest. Accordingly, at least part of the processing pathway will include a determination of whether services are to be performed or not, partially defining the processing pathway, in one embodiment.

According to various embodiments, services that may be performed on packets include, but are not limited to firewall services, intrusion prevention system (IPS) services, intrusion detection system (IDS), IPS/IDS services, server load balancing services, LAN optimization services, VPN services, video optimization services, network address translation (NAT) services, encryption services, decryption services, etc., among many other possibilities, as would be known to one of skill in the art.

In one embodiment, a VXLAN frame format may be as follows:

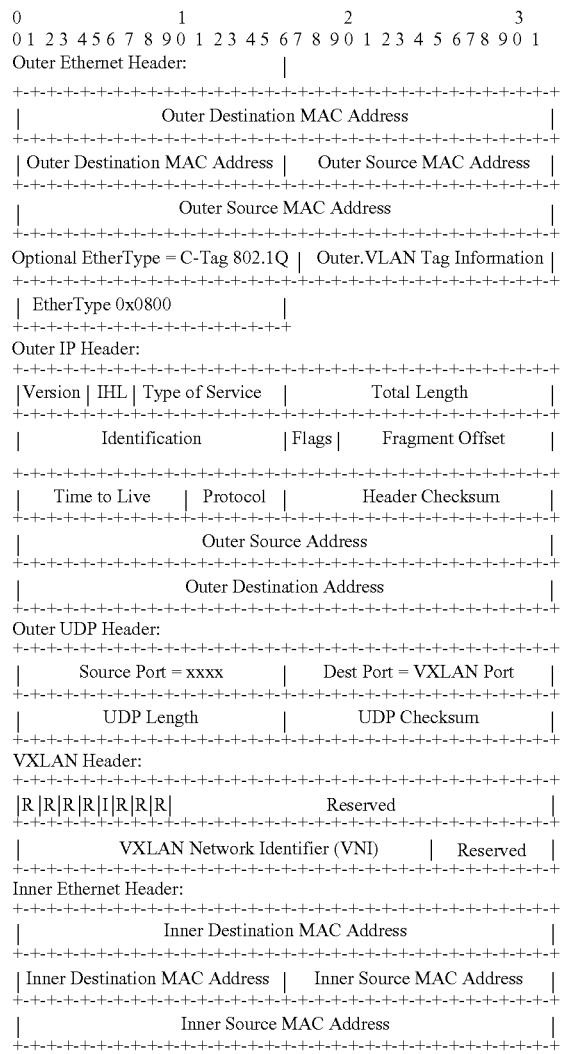

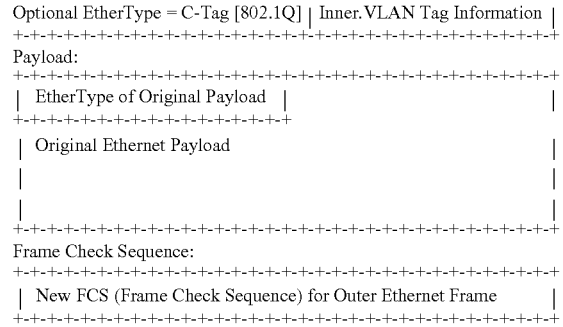

This frame format may be used for determining if a packet should be inspected for an inner packet in a number of different ways. In one such way, the destination port (Dest Port) may be determined. In the frame format shown above, as an example, the destination port is a VXLAN Port, which indicates that the packet has an overlay header. Accordingly, this packet may be un-encapsulated in order to determine what the inner packet comprises, and then whether services should be performed on the inner packet. Of course, other ways of determining whether services should be performed on an inner packet, and if a packet comprises an inner packet may be used, as known to those of skill in the art and described herein.

Figure 8:
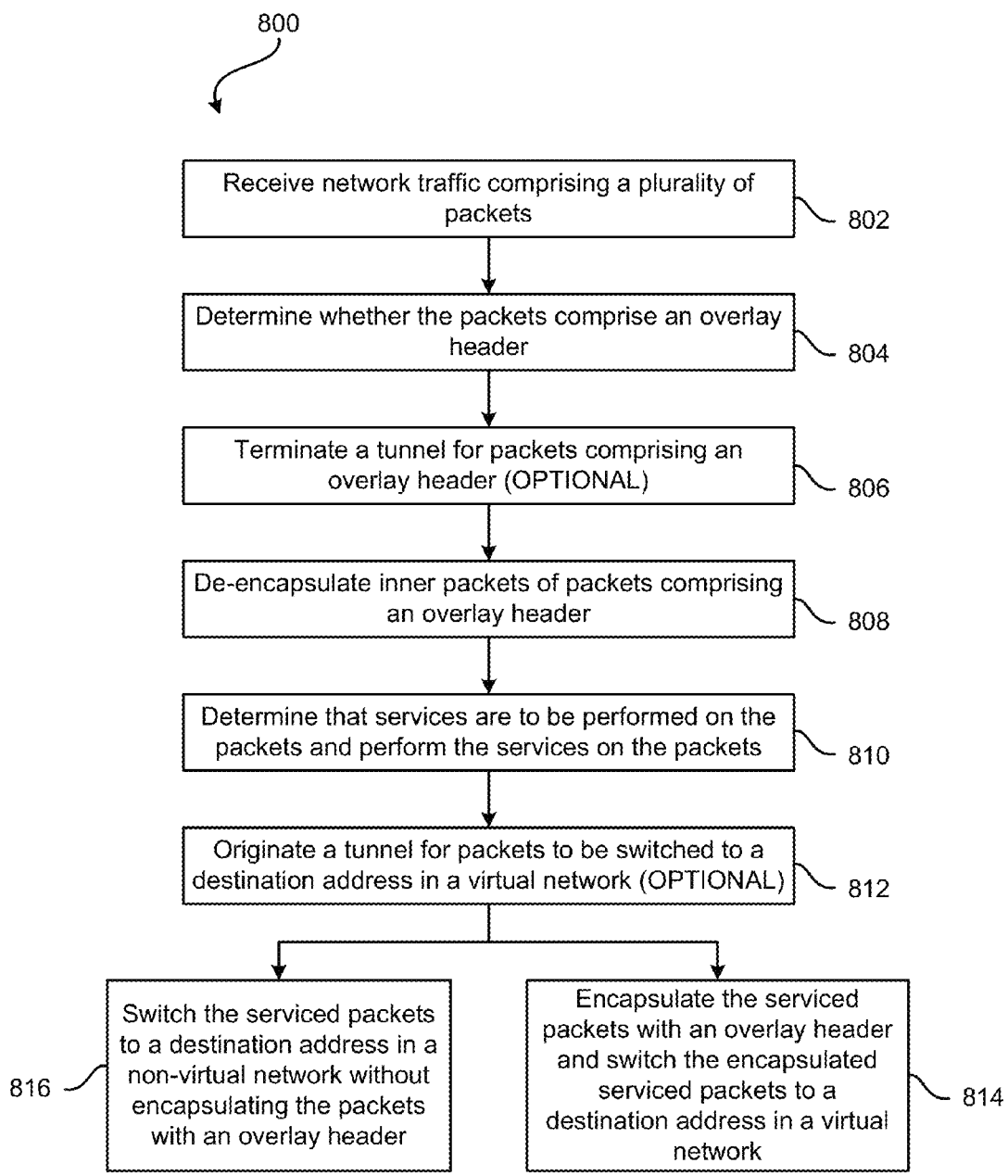
FIG. 8 is a flowchart of a method, according to one embodiment.

Now referring to FIG. 8, a flowchart of a method 800 is shown, according to one embodiment. The method 800 may be performed in accordance with the present invention in any of the environments depicted in FIGS. 1-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in one embodiment, the method 800 may be partially or entirely performed by an overlay network device, a processor (such as a CPU, an ASIC, an FPGA, etc.), a VON gateway, or an INE, in various approaches.

As shown in FIG. 8, method 800 may initiate with operation 802, where network traffic comprising a plurality of packets is received. In one approach, the network traffic may be received at a network gateway or it may be sent from the network gateway to an overlay network device, as described in more detail herein.

In operation 804, it is determined whether the packets comprise an overlay header. This may be accomplished by determining a destination port of the outer UDP header. If the destination port is a virtual LAN port, such as a VXLAN port, then it may be assumed that the packet includes an overlay header.

In optional operation 806, when the packets are received from a virtual network, a tunnel through which the packets were received may be terminated. In this way, either the gateway, INE, or overlay network device may act as a termination and origination point for tunnels to/from any virtual networks. In one preferred approach, the overlay network device may act as a termination and origination point for tunnels to/from any virtual networks.

In operation 808, inner packets of packets comprising an overlay header are de-encapsulated, thereby providing visibility of the inner packets. The inner packets may be of any type known in the art, such as I/O packets (e.g., Fiber Channel over Ethernet (FCoE) packets), control packets, IP packets, voice packets, etc.

In operation 810, it is determined that services are to be performed on the packets (e.g., inner packets and packets from non-virtual networks)) and the services are performed on the packets.

According to various embodiments, there are many ways to determine that services are to be performed. The port on which the packets were received may dictate services to be performed, the destination port of the packets may dictate services to be performed, the type of packets may dictate services to be performed, etc.

In one embodiment, determining that services are to be performed on the packets may comprise applying ACLs to the plurality of packets to differentiate packets for which services are to be performed from those which will not have services performed thereon.

In further embodiments, a type of packet which will have services performed thereon may be changed, altered, designated, etc., by applying a different ACL or ACLs to the plurality of packets. The ACLs will capture packets for which services are to be performed. A system administrator or some other authorized user may designate a plurality of ACLs for designating many different types of packets to receive services thereon, as would be understood by one of skill in the art upon reading the present descriptions.

According to several embodiments, the services may include one or more of: firewall services, IPS, IDS, server load balancing services, VPN services, video optimization services, and/or WAN optimization services, among other possibilities. In one approach, the services may include more than two of the above listed services.

In optional operation 812, a tunnel may be originated for packets having a destination address in a virtual network. This may be performed using any method known by one of skill in the art. In this way, either the gateway, INE, or overlay network device may act as a termination and origination point for tunnels to/from any virtual networks. In one preferred approach, the overlay network device may act as a termination and origination point for tunnels to/from any virtual networks.

Depending on the type of packets which are being sent out, the method 800 either continues to operation 814 (for packets destined to a virtual network) or operation 816 (for packets destined to a non-virtual network).

In operation 814, the serviced packets are encapsulated with an overlay header and switched to a destination address in a virtual network. This may be performed by either of the overlay network device or the gateway, in various embodiments. Of course, the overlay network device may be a chipset or processor embedded in the gateway, in some approaches.

In operation 816, the serviced packets are switched to a destination address in a non-virtual network without encapsulating the packets with an overlay header.

The method 800 may be performed, in various embodiments comprising all or some of the operations described in FIG. 8 in computer program products, other methods, logic, and systems.

In one such embodiment, a system comprises an overlay network device, which comprises an interface adapted for electrically communicating with a VON gateway, logic adapted for receiving a plurality of packets from the VON gateway, logic adapted for determining whether the plurality of packets comprise an overlay header, logic adapted for de-encapsulating inner packets of packets comprising an overlay header, logic adapted for performing services on the plurality of packets or the de-encapsulated inner packets, and logic adapted for either encapsulating the serviced inner packets or the serviced packets with an overlay header to be switched to a destination address in a virtual network and sending the encapsulated packets to the VON gateway or sending the serviced packets to the VON gateway without encapsulating the packets with an overlay header to be switched to a destination address in a non-virtual network.

In some further embodiments, the system may further include the VON gateway connected to one or more virtual networks and one or more non-virtual networks. In these embodiments, the VON gateway may comprise logic adapted for performing routing functions on network traffic (such as packets received from virtual networks and/or non-virtual networks, as described herein), logic adapted for routing a plurality of packets of the network traffic to the overlay network device, and logic adapted for receiving the plurality of packets back from the overlay network device.

In a further embodiment, the VON gateway may be adapted for applying ACLs to network traffic received on ports of the VON gateway to direct certain received packets to the overlay network device for performing services thereon. Furthermore, a type of packet having services performed thereon may be changed by having the VON gateway apply a different ACL to the network traffic received on ports of the VON gateway.

In another embodiment, the overlay network device may further comprise logic adapted for terminating a tunnel for packets comprising an overlay header, and logic adapted for originating a tunnel for packets to be switched to a destination address in a virtual network. In this way, the overlay network device may act as an origination and termination point for tunnels to/from any of the virtual networks, removing this functionality from the VON gateway, in some approaches.

Any system described herein, such as VON gateways, overlay network devices, etc., may include one or more interfaces adapted for electrically communicating with one or more virtual networks and one or more non-virtual networks.

Figure 9:
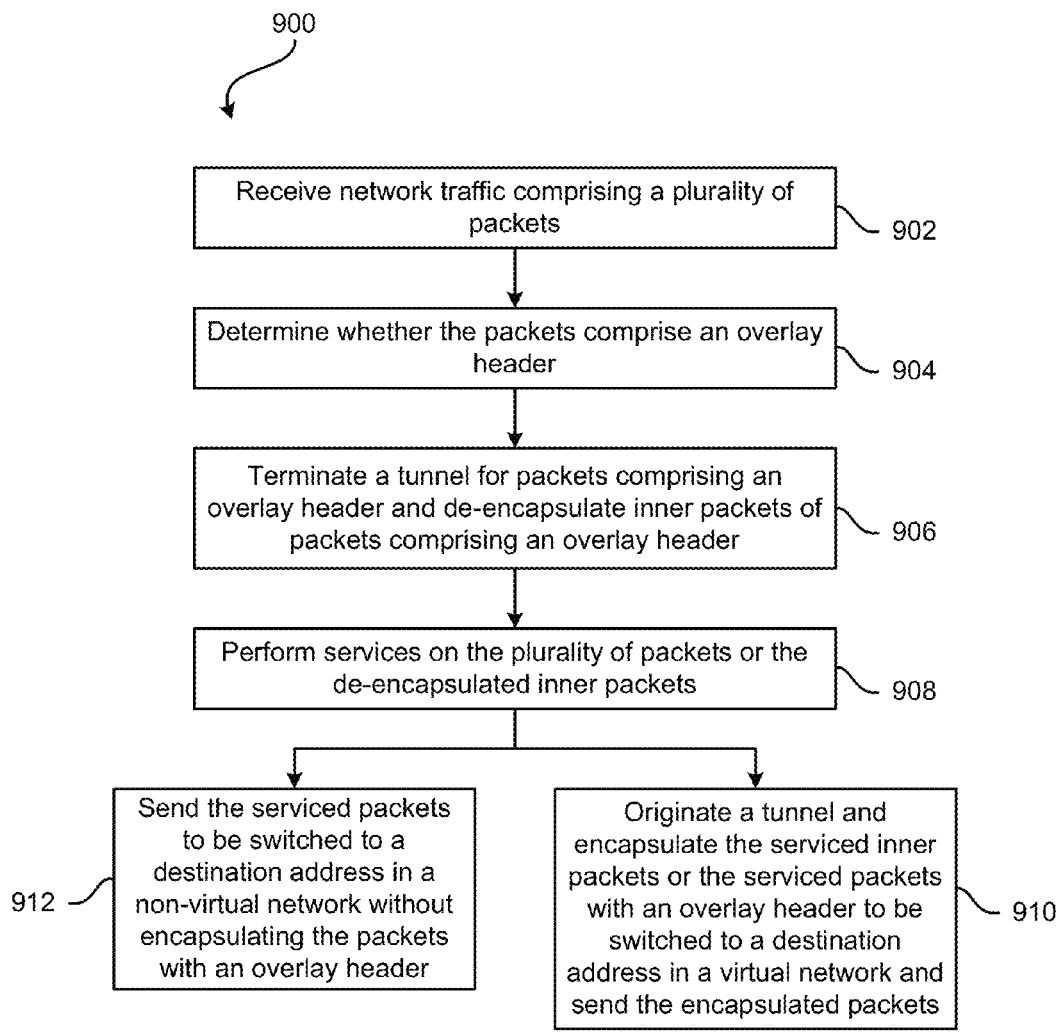
FIG. 9 is a flowchart of a method, according to one embodiment.

Now referring to FIG. 9, a flowchart of a method 900 is shown, according to one embodiment. The method 900 may be performed in accordance with the present invention in any of the environments depicted in FIGS. 1-7, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in one embodiment, the method 900 may be partially or entirely performed by an overlay network device, a processor (such as a CPU, an ASIC, an FPGA, etc.), a VON gateway, or an INE, in various approaches.

As shown in FIG. 9, method 900 may initiate with operation 902, where network traffic comprising a plurality of packets is received. In one approach, the network traffic may be received at a network gateway or it may be sent from the network gateway to an overlay network device, as described in more detail herein.

In operation 904, it is determined whether the packets comprise an overlay header. This may be accomplished by determining a destination port of the outer UDP header. If the destination port is a virtual LAN port, such as a VXLAN port, then it may be assumed that the packet includes an overlay header.

In operation 906, when the packets are received from a virtual network, a tunnel through which the packets were received is terminated and inner packets of packets comprising an overlay header are de-encapsulated, thereby providing visibility of the inner packets. In this way, either the VON gateway, INE, or overlay network device may act as a termination and origination point for tunnels to/from any virtual networks. In one preferred approach, the overlay network device may be embedded in a VON gateway and the VON gateway may act as a termination and origination point for tunnels to/from any virtual networks. The inner packets may be of any type known in the art, such as I/O packets (e.g., Fiber Channel over Ethernet (FCoE) packets), control packets, IP packets, voice packets, etc.

In operation 908, services are performed on the plurality of packets or the de-encapsulated inner packets. According to various embodiments, there are many ways to determine which services are to be performed. The port on which the packets were received may dictate services to be performed, the destination port of the packets may dictate services to be performed, the type of packets may dictate services to be performed, etc.

In one embodiment, determining which services are to be performed on the packets may comprise applying ACLs to the plurality of packets to differentiate packets for which services are to be performed from those which will not have services performed thereon.

In further embodiments, a type of packet which will have services performed thereon may be changed, altered, designated, etc., by applying a different ACL or ACLs to the plurality of packets. The ACLs will capture packets for which services are to be performed. A system administrator or some other authorized user may designate a plurality of ACLs for designating many different types of packets to receive services thereon, as would be understood by one of skill in the art upon reading the present descriptions.

According to several embodiments, the services may include one or more of: firewall services, IPS, IDS, server load balancing services, VPN services, video optimization services, and/or WAN optimization services, among other possibilities. In one approach, the services may include more than two of the above listed services.

In operation 910, a tunnel is originated for packets having a destination address in a virtual network, and the serviced inner packets or the serviced packets are encapsulated with an overlay header to be switched to a destination address in a virtual network and the encapsulated packets are sent thereto.

This operation may be performed using any method known by one of skill in the art. In this way, either the VON gateway, INE, or overlay network device may act as a termination and origination point for tunnels to/from any virtual networks. In one preferred approach, the overlay network device may be embedded in a VON gateway and the VON gateway may act as a termination and origination point for tunnels to/from any virtual networks.

Furthermore, in operation 912, any packets to be switched to a non-virtual network are sent thereto without encapsulating the packets with an overlay header.

According to another embodiment, a computer program product for providing services to network traffic on a virtual overlay network may comprise a computer readable storage medium (of a type described herein or as known to one of skill in the art, including non-transitory mediums) having computer readable program code embodied therewith. The computer readable program code comprises computer readable program code configured for receiving network traffic comprising a plurality of packets, computer readable program code configured for determining whether the plurality of packets comprise an overlay header, computer readable program code configured for terminating a tunnel and de-encapsulating inner packets of packets comprising an overlay header, computer readable program code configured for performing services on the plurality of packets or the de-encapsulated inner packets, computer readable program code configured for alternatively: originating a tunnel and encapsulating the inner packets or the plurality of packets with an overlay header to be switched to a destination address in a virtual network and sending the encapsulated packets to the VON gateway, or sending the serviced packets to the VON gateway without encapsulating the packets with an overlay header to be switched to a destination address in a non-virtual network.

In a further embodiment, the computer program product may include computer readable program code configured for applying ACLs to the network traffic to determine that services are to be performed on the plurality of packets prior to determining whether the plurality of packets comprise an overlay header. In another further approach, a type of packet having services performed thereon may be changed by specifying a different ACL to apply to the network traffic.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for providing services to network traffic on a virtual overlay network, the method comprising:
    receiving network traffic comprising a plurality of packets using an overlay network device;
    applying one or more Access Control Lists (ACLs) to the network traffic to determine that services are to be performed on the network traffic prior to determining whether the plurality of packets comprise an overlay header, wherein each ACL specifies at least one characteristic of a packet that dictates that at least one service is to be performed on any packets corresponding to the at least one characteristic;
    determining whether the plurality of packets comprise an overlay header using the overlay network device;
    terminating a tunnel and de-encapsulating inner packets of packets comprising the overlay header using the overlay network device;
    performing services on the plurality of packets or the de-encapsulated inner packets using the overlay network device;
    originating a tunnel and encapsulating the serviced inner packets or the serviced packets with an overlay header and sending the encapsulated packets when the serviced inner packets or the serviced packets are to be switched to a destination address in a virtual network using the overlay network device; and
    sending the serviced packets without encapsulating the packets with the overlay header when the serviced packets are to be switched to the destination address in a non-virtual network using the overlay network device,
    wherein the at least one characteristic of the packet includes: a port on which the network traffic was received, a destination port on which the network traffic is to be sent, and a type of inner packet included in the packets comprising the overlay header.

2. The method as recited in claim 1, further comprising:
    determining the at least one characteristic of the packet from the overlay header prior to applying the one or more ACLs.

3. The method as recited in claim 1, wherein which packets have services performed thereon is changed by specifying one or more different ACLs to apply to the network traffic.

4. The method as recited in claim 1, wherein the services include at least one of:
firewall services;
intrusion prevention services (IPS);
intrusion detection services (IDS);
server load balancing services;
virtual private network (VPN) services;
video optimization services; and
wide area network (WAN) optimization services.

5. The method as recited in claim 1, further comprising:
performing routing functions on network traffic using a virtual overlay network (VON) gateway connected to the virtual network and the non-virtual network;
routing the network traffic to the overlay network device using the VON gateway; and
receiving the plurality of packets back from the overlay network device using the VON gateway,
wherein the one or more ACLs are applied using the VON gateway.

6. The method as recited in claim 5, wherein the VON gateway is integral to the overlay network device.

7. A method for providing services to network traffic on a virtual overlay network, the method comprising:
receiving overlay-encapsulated network traffic comprising a plurality of inner packets using an overlay network device;
applying one or more Access Control Lists (ACLs) to the overlay-encapsulated network traffic to determine that services are to be performed on the plurality of inner packets prior to de-encapsulating the inner packets from an overlay header, wherein each ACL specifies at least one characteristic of a packet that dictates that at least one service is to be performed on any packets corresponding to the at least one characteristic;
terminating a first tunnel on which the overlay-encapsulated network traffic is received and de-encapsulating the plurality of inner packets from the overlay header;
performing one or more services on the plurality of inner packets to provide one or more serviced inner packets;
originating a second tunnel between the overlay network device and a destination device having a destination address specified by the overlay header;
encapsulating the one or more serviced inner packets with the overlay header to provide encapsulated packets; and
sending the encapsulated packets to the destination address in a virtual network,
wherein the at least one characteristic of the packet includes: a port on which the overlay-encapsulated network traffic was received, a destination port on which the overlay-encapsulated network traffic is to be sent, and a type of inner packet included in the overlay-encapsulated network traffic.

8. The method as recited in claim 7, further comprising:
determining the at least one characteristic of the packet from the overlay header, the overlay header being a Virtual eXtensible Local Area Network (VXLAN) overlay header.

9. The method as recited in claim 7, wherein which packets have services performed thereon is changed by specifying one or more different ACLs to apply to the overlay-encapsulated network traffic.

10. The method as recited in claim 8, wherein one ACL determines that services are to be performed on the plurality of inner packets based on a destination port being a VXLAN Port.

11. The method as recited in claim 7, wherein the types of inner packets include: Input/Output (I/O) packets, Fiber Channel over Ethernet (FCoE) packets, control packets, Internet Protocol (IP) packets, and voice packets.

12. The method as recited in claim 7, further comprising:
performing routing functions on the overlay-encapsulated network traffic using a virtual overlay network (VON) gateway connected to the virtual network and a non-virtual network;
routing the network traffic to the overlay network device using the VON gateway; and
receiving the plurality of packets back from the overlay network device using the VON gateway,
wherein the one or more ACLs are applied using the VON gateway.

13. The method as recited in claim 12, wherein the VON gateway is integral to the overlay network device.

14. The method as recited in claim 7, wherein the services include at least one of:
firewall services;
intrusion prevention services (IPS);
intrusion detection services (IDS);
server load balancing services;
virtual private network (VPN) services;
video optimization services; and
wide area network (WAN) optimization services.

* * * * *